Jan. 8, 1957 C. E. HAWK 2,776,850
COMBINED VALVE AND COUPLING
Filed Aug. 16, 1952 4 Sheets-Sheet 1

INVENTOR.
CARSON E. HAWK
BY
D. Gordon Angus
ATTORNEY

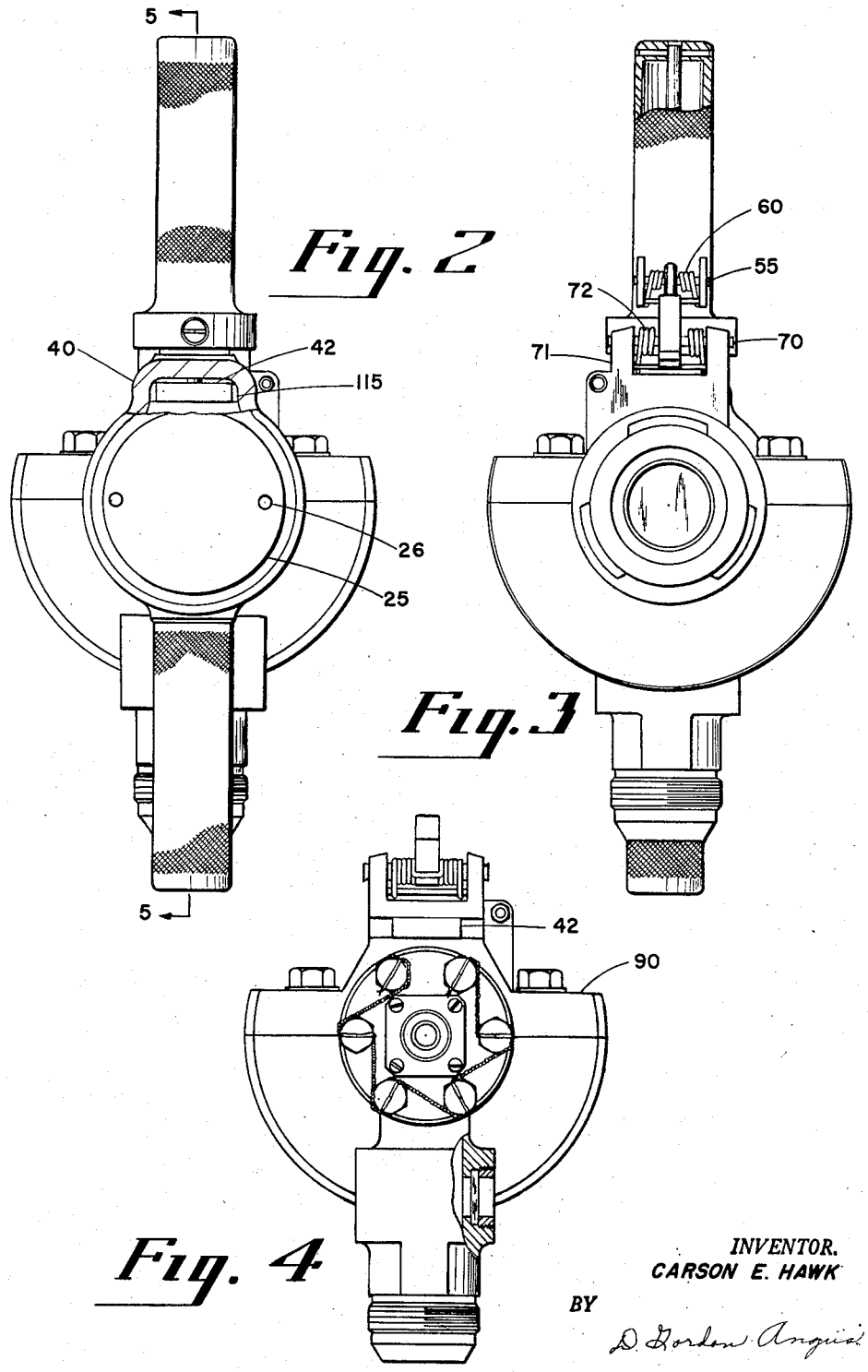

Jan. 8, 1957 C. E. HAWK 2,776,850
COMBINED VALVE AND COUPLING
Filed Aug. 16, 1952 4 Sheets-Sheet 3

INVENTOR.
CARSON E. HAWK
BY
D. Gordon Angus
ATTORNEY

Jan. 8, 1957          C. E. HAWK          2,776,850

COMBINED VALVE AND COUPLING

Filed Aug. 16, 1952          4 Sheets-Sheet 4

INVENTOR.
CARSON E. HAWK

BY

*D. Gordon Angus*

ATTORNEY

United States Patent Office 2,776,850
Patented Jan. 8, 1957

2,776,850

COMBINED VALVE AND COUPLING

Carson E. Hawk, Pomona, Calif., assignor, by mesne assignments, to Aerojet-General Corporation, Cincinnati, Ohio, a corporation of Ohio Application August 16, 1952, Serial No. 304,714

5 Claims. (Cl. 284—17)

This invention relates to fluid filling devices and has for its principal object to provide a leak proof filling valve for filling a tank or receptacle. A related object is to provide such a filling valve useful in a closed cycle filling system. Another related object is to provide such a filling valve that will not allow fluid flow until the system is completely and safely closed.

It is a common practice to fill tanks and receptacles through filling conduits in the form of a valve. In many cases especially when the tank is being filled with a toxic or corrosive fluid, serious injuries may result due to the fact that some of the fluid can splash through the vents or overflow from the tank when it is full, or may leak or run out of the filling device or from the receptacle of the tank when the device is removed from the tank. In U. S. Patent No. 2,401,124, issued May 28, 1946, a filling valve is shown which is capable of overcoming many of these difficulties. Also in a corresponding patent application, Serial No. 144,932, filed under the name of George Harkey et al., on February 18, 1950, and assigned to the same assignee as the present application there is shown another form of filling valve capable of being used in a closed system, and capable of adjustment so that it will fill the tank to any desired height.

In accordance with the present invention I have provided a filling valve arrangement which is an improvement over the valves of the foregoing type in that the construction makes it impossible to initiate any flow of fluid or to disconnect the filling valve from the tank unless the tank can be opened with safety and the filling portions are free of the fluid. In a preferred manner of operation there are used a pair of the filling valves, one of which serves as a charging valve and the other as a venting valve. This will provide a closed filling system.

The invention will be better understood with reference to the following description and the accompanying drawings of which:

Fig. 2 shows a top plan view of the filler valve shown in Fig. 1, also in closed position;

Fig. 3 is a plan view looking at the filler valve of Fig. 1 from the bottom side;

Fig. 4 is a top view of the interior portion of the filler valve with the cap and handles removed;

Figure 1:
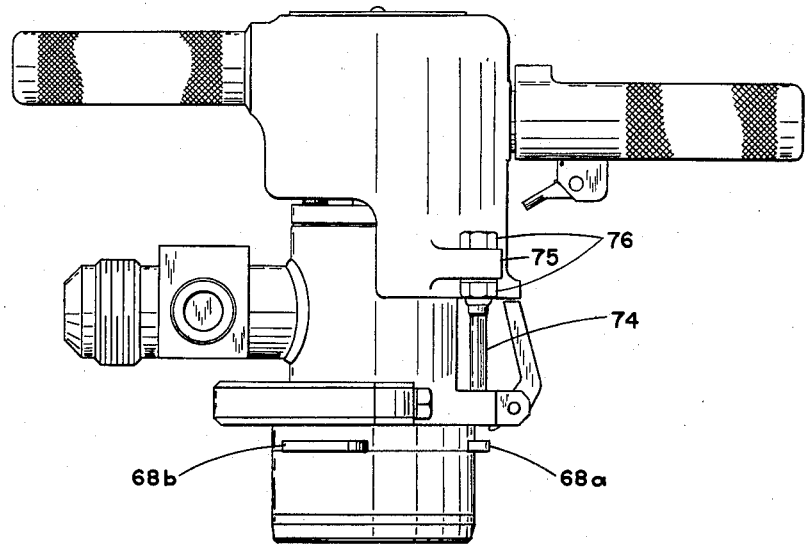
Fig. 1 shows a plan view of a filler valve according to this invention, the valve being in its closed position.

Referring to the drawings, the filler valve comprises a housing 10 having an internal chamber 11 formed by a walled member 12 to which are attached members forming sliding or bearing surfaces for a spindle 13. The spindle comprises a centrally located cylindrical portion 14 which cones down at 15 to a smaller cylindrical diameter at 16; and at its lower end it cones at 17 to a larger cylindrical diameter at 18 which acts as a valve element or head.

At the opposite end the spindle passes through the opening 19 of a hub 20 having an internal recess at 21 which receives a lock nut threaded over threads 23 of the spindle. Suitable washers 24 are preferably provided for longitudinal adjustment of the spindle. For convenience a cover plate 25 is placed over the lock nut and may be held by a screw 26 threaded into the top of the spindle.

Figures 9, 10:
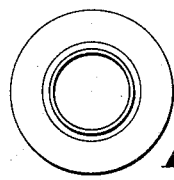
Fig. 9 shows a side view of a seal used in the filler valve assembly.
Fig. 10 shows a face view of the seal of Fig. 9.

The members acting as bearing members restraining the spindle are as follows: A sleeve member 27 provided with a flange 28 is fitted over the top end of housing member 12, leaving a space between the flange and the spindle portion 14 within which is fitted a ring member 29 held in place by a flanged ring 30. The arrangement is such that suitable seal members 31, 32 and 33 are held in position against the spindle portion 14 to prevent leakage of fluid. These seal members each have a cylindrical portion and a flat annular portion adapted to be bound in position by the respective rings and flange and should ordinarily have some resilience. One of these seals which may be of a plastic material, is illustrated in Figs. 9 and 10. Member 28 is held to member 12 by bolts 34 and member 30 is held to member 28 by bolts 35, to hold the assembly together.

At the outlet end 62 of the housing, there is provided a ring member 36 held against the end of housing member 12, and an outer ring member 37 held against ring 36, this assembly being held together by bolts 38. A seal 107 which may be similar to that of Figs. 9 and 10 is held between members 12 and 36, the seal extending between the surfaces of members 12 and 18.

Figure 5:
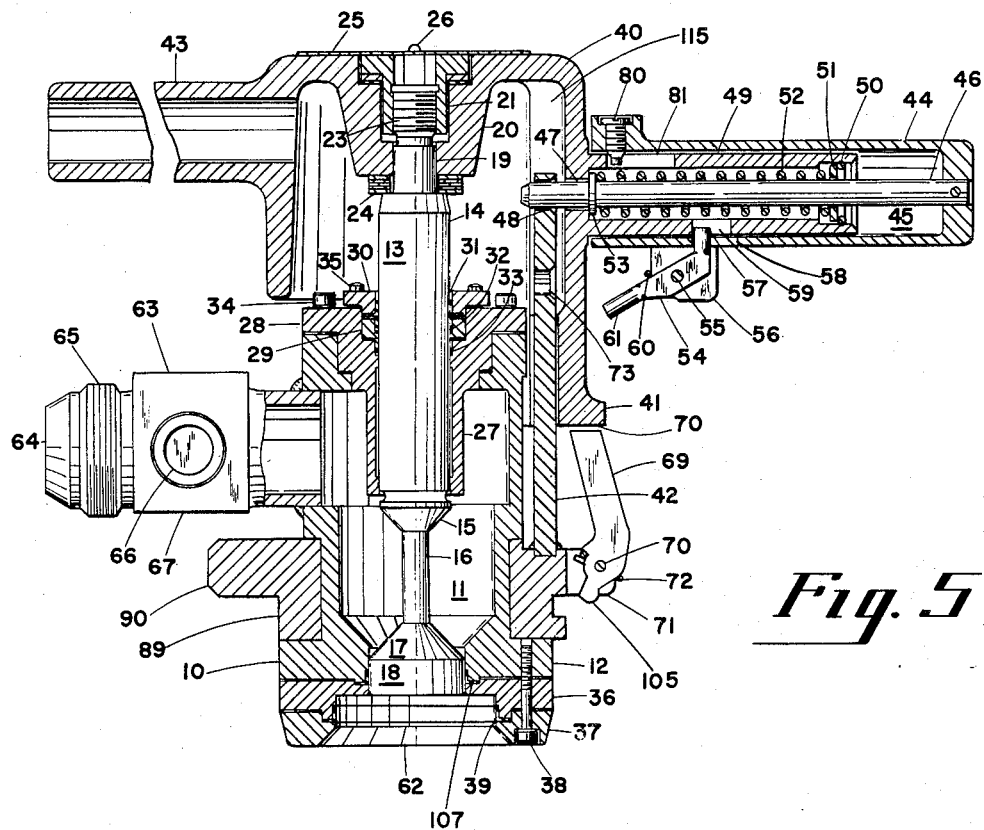
Fig. 5 is a cross-section view taken on the line 5—5 of Fig. 2.

The hub 20 is part of a cap member 40 having a side portion 41 which fits down over a bar 42 attached or welded to ring 90 of the frame. A pair of handles 43 and 44 are attached to the cap member 40 for the purpose of raising or lowering it relative to the housing and bar 42, and also of turning the entire housing. Handle 43 is a fixed handle, but handle 44 is of a retractable construction, comprising a hollow arm 45 fastened at its outer end to a pin 46 which extends along the longitudinal axis of member 45 and passes through a hole 47 of wall 41 and is adapted to register with a hole 48 of bar 42. A sleeve 49 integral with the cap member 40 protrudes into the hollow arm 45 and is provided near its end with a snap ring 50 against which sets a washer 51. The end of a compression spring 52 rests against the washer, while the other end of the compression spring bears against a collar 53 formed on the pin 46. By this arrangement, the handle 44 is urged toward the left with reference to Fig. 5 so as to hold the pin 46 in the registration hole 48. The handle, however, is retractable toward the right against the compression of the spring so as to withdraw the pin 46 from the registration hole, there being provided a screw 80 through the member 45 and slidable in a slot 81 of the sleeve serving to limit the retraction movement.

To provide for locking the handle in its registered position, there is provided a latch in the form of a lever 54 pivoted at 55 to lugs 56 attached to the handle member 45; and a protruding finger 57 passes through an opening 58 of handle member 45 and into an opening 59 of the sleeve 49. A helical spring 60 wrapped around the pivot pin 55 tends to hold the latch in the latched position. To release the latch the operator can push up on the handle 61. When the pin 46 is retracted from its registration hole 48, the operator may lower the cap 40 from the position shown in Fig. 5. When the cap is lowered, the spindle 13 moves downward with reference to the housing sufficient to cause the cylindrical part 18 of the valve member to move down into the widened part of the fluid outlet opening 62 and away from the sealing member 107. This will allow fluid in chamber 11 to flow out the outlet opening 62.

The fluid inlet to the filler valve is provided by a conduit or nipple 63 communicating with the internal chamber 11 and having an inlet opening at 64. For the purpose of coupling with a suitable supply hose or connection there are provided coupling threads 65. If desired, a suitable sight glass 66 may be provided by forming a portion of the conduit with a square cross-section at 67; and this sight glass will show the flow of fluid.

For the purpose of fitting the outlet of the valve to the receptacle or neck of a tank which is to be filled with fluid, the housing is provided near its outlet with a number of lugs of which the lugs 68a and 68b are shown. As a safety precaution there is provided a safety lever 69 which normally remains in the position shown in Fig. 5 with its end beneath the shoulder 70 of the cap wall 41, so that the nozzle valve cannot be opened until the lever 69 is moved out of the way. Such movement of lever 69 is provided by mounting it on a pivot pin 70 held in lugs 71 mounted on the housing; and a coiled spring 72 tends to urge the lever into the safety position illustrated in Fig. 5. Movement of the lever 69 in the clockwise direction, (with reference to Fig. 5), will allow the cap 40 to move downwardly over the housing when the handle member 45 is retracted; and for the purpose of registering the valve in its downward or opened position, there is provided a registration hole 73 in the wall 42 into which the pin 46 is pushed by the spring 52 when in position.

To assure that the head 40 does not turn relative to the rest of the housing, the bar 42, attached to the housing member 90 is placed in a slotted portion or groove 115 of the cap with sufficient clearance so that the bar can readily slide through the groove.

Figure 6:
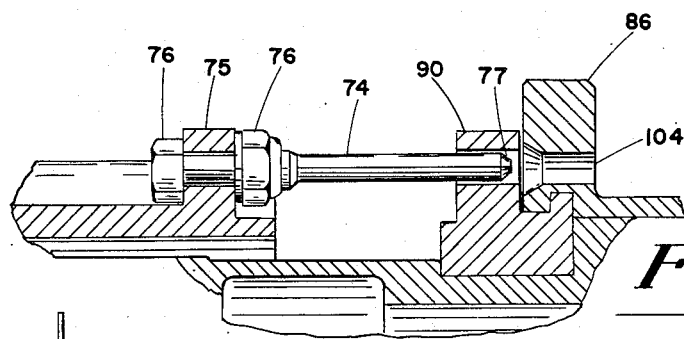
Fig. 6 is an enlarged view of a locking and safety device used in the filler valve.

For the purpose of produce registration of the filler valve with the receptacle to be filled there is provided a vertical guide pin 74 fastened to the boss 75 of the cap by bolts 76. The lower end of the pin 74 protrudes into a hole 77 of the housing ring 90 (see Fig. 6) and is adapted to register with the receptacle to be filled in a manner described hereinafter.

Figure 7:
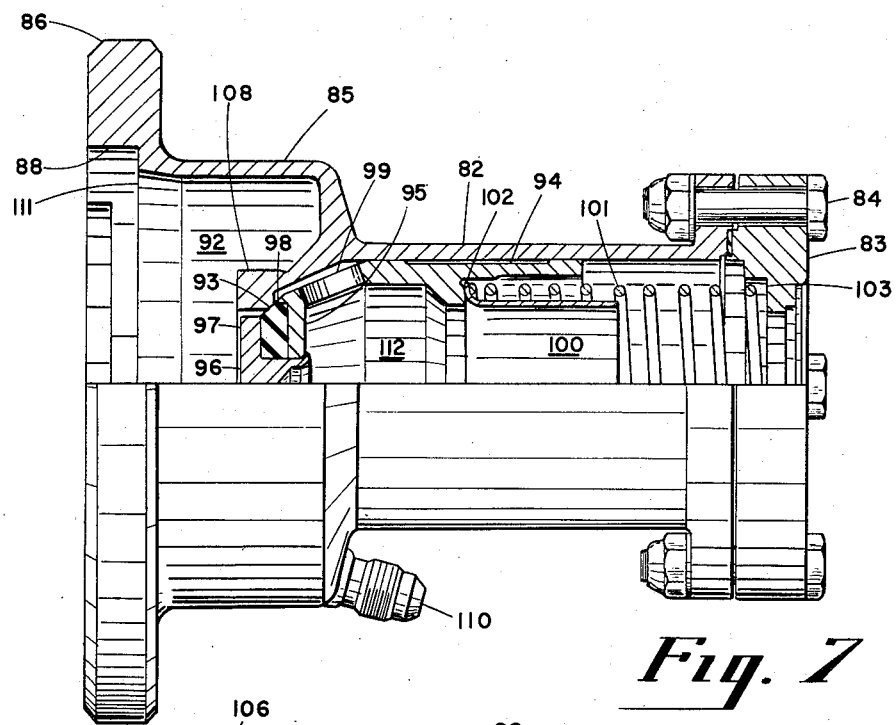
Fig. 7 is a view partly in cross-section showing the receptacle of a tank into which the valve is seated when installed.
Figure 8:
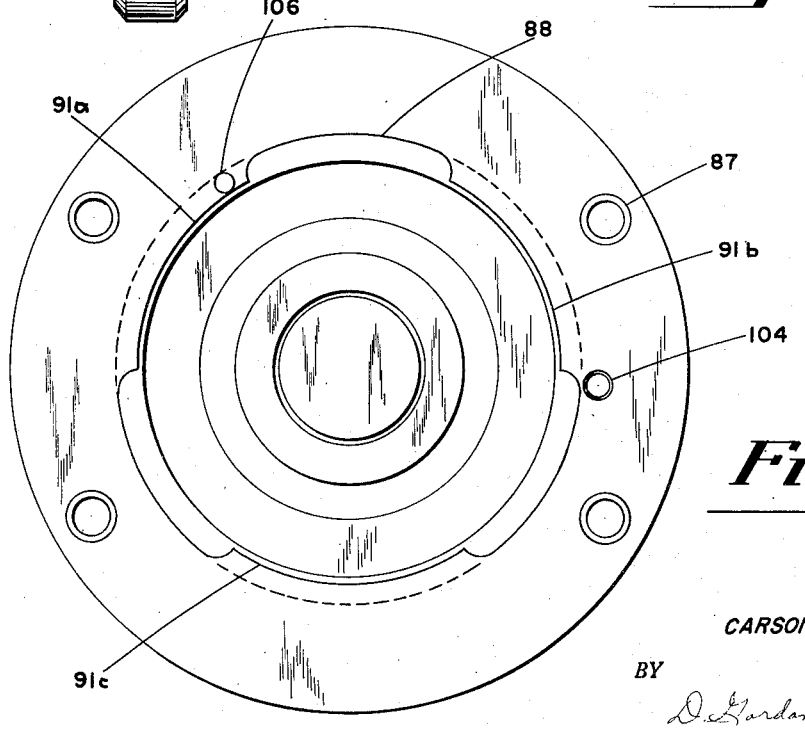
Fig. 8 is a plan view looking at the top of receiving end of the receptacle of Fig. 7.

For the purpose of putting the filler valve to the tank to be filled with fluid, the tank should be provided with a special neck or receptacle for receiving the filler valve. Such a receptacle is shown in Fig. 7. This comprises a main receptacle housing 82 to which is attached a ring member 83 by bolts 84. The opposite end of the housing widens to an enlarged diameter 85 terminated by a collar 86 which contains circumferential holes 87 for bolting the collar to the tank. In this arrangement the receptacle housing 82 will ordinarily lie within the tank with only the flange 86 at the exterior of the tank. Within the flange, there is provided a shoulder 111; and the internal diameter 88 is sufficient to admit the member 89 of the filler valve but not sufficiently great to admit the flange 90 on the member 89. Within the diameter 83, there are provided a number of lugs 91a, 91b, etc., corresponding with the lugs 68a, 68b, etc., of the filler valve. Thus, when the filler valve is inserted into the diameter 83, the lugs 68a, 68b, etc., fit beneath or back of the corresponding lugs 91a, 91b, etc., of the receptacle; and in this position, the outlet 62 of the filler valve is within the diameter 85 of the receptacle and in communication with the receptacle chamber 92. Fitting 110 is simply for draining the chamber 92 when desired. Within chamber 92, the receptacle housing forms an annular valve seat 93 which receives the valve end of a piston member 94 which terminates at its valve end in a solid member 95 to which is fastened a cap 96 which holds between its flange 97 and the member 95, a valve sealing material 98 which may be of rubber, plastic or other suitable rubber-like material for sealing.

The internal part of the plunger 94 is hollow at 112; and holes 99 through the valve end of the valve piston provide communication between chamber or channel 112 and the chamber 92 of the receptacle and the annular passageway 100; although this passageway 100 is only open to chamber 92 when the plunger 94 is moved to the right (with reference to Fig. 7) away from the valve seat.

The plunger 94 is urged against the valve seat by means of a compression spring 101 compressed between a shoulder 102 within the plunger, and an internal shoulder 103 of the ring member 83. Thus, the valve is normally seated by action of the spring. But when the filler valve is set into the receptacle, the opening of the filler valve by longitudinal movement of the valve spindle will cause the valve head to press against the end of the plunger 94 to open the plunger against the action of the spring 101.

To use the filler valve, the operator will connect a suitable pipe or hose connection from a source of fluid to the nipple 63; and this fluid will be under some pressure. The valve of the filler valve, however, will be in its closed or sealed position shown in Fig. 5 so that although fluid will be in chamber 11 it will not flow out the outlet end 62. The operator will insert the outlet end 62 of the filler valve into the receptacle (Fig. 7) of the tank to be filled and by grasping the handles 43 and 44 will push the end of the filler valve into the diameters 85 and 88 of the receptacle until the lugs 68a, 68b, etc. get past the corresponding lugs 91a, 91b, etc. of the receptacle. The operator will then turn the filler valve with reference to the receptacle by turning on the handles; and due to the presence of bar 42 this will turn the entire filler valve housing so that the lugs of the filler valve will move behind the lugs of the receptacle until one of the valve lugs engages the stop 106 of the receptacle. The action of coupling the filler valve to the tank receptacle will cause the knob 105 of safety lever 69 to engage the end surface of collar 86; and this will rotate member 69 clockwise (with reference to Fig. 5) against the action of its spring, so as to remove the safety feature. The operator may then, after the lugs are engaged, trip the member 61 of the handle trip lever to retract the handle and withdraw the pin 46 from the registration hole 48. The cap 40 will then move down until pin 46 can engage registration hole 73 whereupon the operator will allow the handle to move inward to produce the registration in hole 73. During this downward motion of the cap, the pin 74 will move into registration hole 104 of the receptacle flange, so long as the stop 106 is in engagement with the corresponding lug of the filler valve; and this registration in hole 104 will prevent any disengagement of the lugs. The same downward motion of the cap will cause valve member 18 to move into engagement with the head of plunger 94 to retract the plunger, thereby permitting communication through chamber 11, opening 62 and chamber 100, thereby permitting fluid flow into the tank.

It will be recognized that by the present invention there is provided a simple filler valve having safety features which prevent the undesirable or accidental flow or leakage of fluid attendant upon filling a tank. The provision of lever 69 prevents accidental opening of the filler valve until the lugs 68a, 68b, of the valve have entered the portion 88 of the receptacle; and furthermore, the filler valve cannot be opened until the lugs are engaged with the lugs of the receptacle, since the valve will not open until registration pin 74 is aligned with registration hole 104.

It will generally be desirable to use two of the above-described filler valves with a tank; and each filler valve will be placed in its own tank receptacle as described above. In such an arrangement one of the filler valves will be used to introduce fluid or liquid into the tank while the other filler valve will simply act as an overflow to carry excess fluid back to the supply source. It will be understood, however, that such a closed system need not necessarily be used, as the filler valve can be used alone in an ordinary manner to fill a tank.

I claim:

1. A fluid filler valve comprising a housing containing a chamber, a fluid inlet into the chamber, a fluid outlet from the chamber, a valve seal between the chamber and the outlet, a spindle within the chamber movable in the direction of its longitudinal axis, the spindle having a valve head adapted to engage the seal when the spindle is in a first position and to be disengaged from the seal when the spindle is in a second position, thereby closing the valve to prevent flow of fluid past the valve head when the valve head is engaged with the seal and opening the valve to permit the flow of fluid past the valve head when the valve head is disengaged from the seal, a cap attached to the spindle, a registration bar engaging the cap and the housing, holding the cap against rotation relative to the housing while permitting movement of the spindle relative to the housing in the direction of the spindle axis and permitting rotation of the housing and the cap as a unit, said housing having a first registration hole and a second registration hole, a registration pin attached to the cap, the first registration hole and the second registration hole being located relative to the pin so that when the spindle is in the first position the pin can enter the first registration hole and when the spindle is in the second position the pin can enter the second registration hole, and springing means for urging the registration pin into either of the registration holes when the pin is juxtaposed thereto, and means for resisting retraction of the pin from either of said holes when the pin is inserted therein, whereby said registration pin is urged into said first registration hole when said head engages said seal and said registration pin is urged into said second registration hole when said head is moved away from said seal, and movement of the head in the direction of the axis of the spindle is prevented by the registration pin unless said registration pin is in a position of retraction from both of said registration holes.

2. In combination, a fluid filler valve and a receptacle therefor, said valve comprising a valve housing having lugs for engagement with the receptacle and containing a chamber having a fluid inlet and a fluid outlet with a valve seal located between the chamber and the outlet, a spindle within the chamber having a head adapted to engage the seal when the spindle is in a first position and to be disengaged from the seal when the spindle is in a second position, thereby closing the valve to prevent flow of fluid past the valve head when the valve head is engaged with the seal and opening the valve to permit the flow of fluid past the valve head when the valve head is disengaged from the seal, a cap attached to the spindle, a registration bar engaging the cap and the valve housing holding the cap and valve housing against relative rotation while permitting relative longitudinal movement in the direction of the spindle's axis, handle means attached to the cap for moving the spindle in the direction of the spindle's axis, and a guide pin attached to the cap, said receptacle comprising a receptacle housing having a chamber into which the valve outlet is fitted when the valve and receptacle are joined, and receptacle lugs on said receptacle housing adapted to engage the lugs on the valve, a stop associated with the lugs for determining the position of complete engagement of the lugs, a guide pin hole in said receptacle adapted to register with said guide pin when the valve and receptacle are in the position of complete engagement, a plunger seat within the receptacle chamber, a plunger normally seated on the plunger seat and holding the receptacle closed, whereby inserting the valve outlet into the receptacle chamber and rotating the valve relative to the receptacle causes the lugs to engage and the guide pin to align with the guide pin hole, and moving the handle means toward the receptacle causes the guide pin to move into the guide pin hole locking the receptacle and valve against further rotation, and also causes the head to move from the valve seat so as to abut against and move the plunger from the plunger seat, whereby a fluid passageway exists from the valve inlet past the valve seal and plunger seat and into the receptacle.

3. A combination according to claim 2 in which a safety lever is pivoted to the valve housing near the valve outlet, being so disposed and arranged as to be juxtaposed toward the cap and prevent movement of said cap to valve opening position when the valve is separated from the receptacle and to be pivoted by the receptacle when the valve outlet is inserted therein so as to be disposed out of contact with the cap.

4. A combination according to claim 2 in which the valve outlet and receptacle have substantially conforming mating surfaces whereby their joinder leaves only a small space in the order of a cubic centimeter in the receptacle housing outside of the plunger in which liquid may remain after the valve is removed from the receptacle.

5. A combination according to claim 2 in which said valve housing has a first registration hole and a second registration hole, a registration pin attached to the cap, the first registration hole and the second registration hole being located relative to the pin so that when the spindle is in the first position the pin can enter the first registration hole and when the spindle is in the second position the pin can enter the second registration hole, and springing means for urging the registration pin into either of the registration holes when the pin is juxtaposed thereto, and means for resisting retraction of the pin from either of said holes when the pin is inserted therein, whereby said registration pin is urged into said first registration hole when said head engages said seal and said registration pin is urged into said second registration hole when said head is moved away from said seal, and movement of the head in the direction of the axis of the spindle is prevented by the registration pin unless said registration pin is in a position of retraction from both of said registration holes.

References Cited in the file of this patent

UNITED STATES PATENTS

| 783,925 | Brake | Feb. 28, 1905 |
| 1,052,088 | Prettyman | Feb. 4, 1913 |
| 2,452,256 | Muller | Oct. 26, 1948 |
| 2,462,512 | Krone et al. | Feb. 22, 1949 |
| 2,653,832 | Carter | Sept. 29, 1953 |

FOREIGN PATENTS

| 657,730 | Great Britain | Sept. 26, 1951 |
| 770,694 | France | July 2, 1934 |